United States Patent
Jackson et al.

(10) Patent No.: US 6,465,547 B1
(45) Date of Patent: Oct. 15, 2002

(54) CROSSLINKED COMPOSITIONS CONTAINING SILANE-MODIFIED POLYPROPYLENE BLENDS

(75) Inventors: Peter Jackson, Toronto (CA); Amarjit Tathgur, Brampton (CA); Marcus P. Heydrich, Mississauga (CA); Dilip K. Tailor, Brampton (CA); Robert Edward Steele, Richmond Hill (CA)

(73) Assignee: Shawcor Ltd., Rexdale (CA)

( * ) Notice: Subject to any disclaimer, the term of this patent is extended or adjusted under 35 U.S.C. 154(b) by 0 days.

(21) Appl. No.: 09/911,565

(22) Filed: Jul. 24, 2001

(30) Foreign Application Priority Data

Apr. 19, 2001 (CA) ............................................. 2344504

(51) Int. Cl.[7] .................. C08L 23/26; C08L 23/20; C08L 23/08
(52) U.S. Cl. .................. 524/71; 264/210.5; 264/210.7; 242/69; 525/105; 525/106; 526/279; 528/17; 528/18
(58) Field of Search ............................. 526/279; 528/17, 528/18; 525/105, 106; 264/210.5, 210.7; 524/69, 71

(56) References Cited

U.S. PATENT DOCUMENTS

| | | | |
|---|---|---|---|
| 3,646,155 A | 2/1972 | Scott | |
| 4,464,425 A | 8/1984 | Voigt et al. | |
| 4,618,654 A | 10/1986 | Schmidtchen et al. | |
| 5,741,858 A | 4/1998 | Brann et al. | |
| 5,756,582 A | 5/1998 | Mori | |
| 5,859,076 A | 1/1999 | Kozma et al. | |
| 5,948,865 A | * | 9/1999 | Shimazaki et al. |

FOREIGN PATENT DOCUMENTS

| | | |
|---|---|---|
| GB | 2093760 | 9/1982 |
| GB | 2 116 986 A * | 10/1983 |

* cited by examiner

Primary Examiner—Robert Dawson
Assistant Examiner—Marc S Zimmer
(74) Attorney, Agent, or Firm—DeLio & Peterson, LLC

(57) ABSTRACT

A moisture-crosslinkable polyolefin material, comprising a silane-grafted polyolefin blend, and coatings or insulations, including heat-shrinkable coatings and insulations, prepared therefrom. The coating material is formed by a process comprising: (a) reacting a pre-blended mixture of polyolefin and polypropylene, or higher polyolefin, resins and optional compatibilizing agent, with an appropriate silane and silane-grafting initiator to produce a silane-modified polyolefin blend composition; (b) forming the coating or insulating material by melt processing the composition produced in step (a) with a silanol condensation catalyst; and (c) crosslinking the formed coating or insulating material by exposing it to moisture, preferably at an elevated temperature.

22 Claims, No Drawings

CROSSLINKED COMPOSITIONS CONTAINING SILANE-MODIFIED POLYPROPYLENE BLENDS

FIELD OF THE INVENTION

The present invention relates to polymeric compositions and their uses, and more particularly to crosslinked compositions of silane-modified blends of polyolefins, more specifically polyolefins such as polyethylene with homopolymers and/or copolymers of propylene and other higher olefins, and their uses as heat shrinkable coating and insulating materials, and as wire and cable insulation materials, but not necessarily restricted thereto.

BACKGROUND OF THE INVENTION

Polyolefins derived from propylene and other higher olefins are ideally suited to the preparation of coatings and insulations designed for use at operating temperatures in excess of those that can be withstood by other polyolefins, for example, polyethylene, which exhibit lower softening and melting temperatures, or do not retain suitable physical properties at higher temperatures. Other attractive features are their high rigidity and toughness, low cost and relatively low density. Applications for these coatings and insulations would include polymeric insulation for electrical wires and cables, and heat-shrinkable protective sleeves for high-temperature transmission pipelines, or for applications requiring greater heat distortion resistance, toughness and rigidity than is afforded by polyethylene-based systems. For example, heat-shrinkable sleeves used for the corrosion protection of high temperature pipeline joints are required to maintain dimensional stability, toughness and integrity at the operating temperature of the pipeline Hence it is necessary to use a material, such as polypropylene, with a softening temperature or melting point higher than the continuous operating temperature of the pipeline to prevent creeping or sagging of the sleeve from the pipe at this temperature.

Also, in order to maximise heat-resistance, hot deformation resistance, and physical properties, such as is required for high temperature electrical insulations, it is necessary to impart some thermoset characteristic to the material. This is done by crosslinking the polymer to some required degree. Crosslinking is also necessary for the production of heat-shrinkable articles to impart controlled shrinkage characteristics. The aim of this invention is to provide a means of preparing crosslinked, predominantly polypropylene-based materials, which can be used in the applications described, but not necessarily restricted thereto.

Polymers in which the predominant chain units comprise propylene or higher olefins, such as butene, are known to preferentially depolymerise when exposed to free radicals required to effect crosslinking. Hence, unlike similar materials, namely polyolefins such as polyethylene and copolymers of polyethylene, it is not possible to directly crosslink these materials to satisfactory levels, as is required, for example, in the production of wire and cable insulations, and heat-shrinkable articles, such as tubing, sheet, and moulded shapes, by using standard free-radical methods of crosslinking, such as electron beam irradiation or peroxide initiated crosslinking.

It is also a well known process to produce crosslinked polyolefins, and articles made therefrom, by grafting a vinyl silane onto an olefin homopolymer or copolymer such as is described in U.S. Pat. No. 3,646,155. Alternatively, the vinyl silane may be copolymerised directly with olefin monomers as described in U.S. Pat. No. 4,413,066, for example. However, since these methods require a free-radical generator to initiate the grafting reaction, the polypropylene or higher polyolefin by itself is unsuited to this method of crosslinking. Hence, it is therefore necessary to resort to alternative strategies to create crosslinked compositions consisting predominantly of polypropylene or higher polyolefins of the type that preferentially degrade in the presence of free-radical generators.

SUMMARY OF THE INVENTION

The present invention overcomes the above-discussed problems of the prior art by providing moisture crosslinkable blends of predominantly polypropylene, or higher polyolefins such as polybutene or polymethylpentene, with silane-modified polyolefins; more specifically of silane-modified blends of polyethylenes or polyethylene copolymers with polypropylene copolymers or homopolymers, with or without an additional material added as a compatibilising agent for the polyolefin and polypropylene.

In the method of the present invention, one or more polypropylene homopolymers, or copolymers of polypropylene with an olefin other than polypropylene, are blended with one or more polyolefins other than polypropylene (hereinafter referred to as polyolefins), preferably polyethylenes or copolymers of polyethylene, the blend being than grafted with a suitable silane to produce the desired silane-modified polypropylene containing composition.

Suitable polyolefins in this invention would include those materials known in the industry as low density polyethylene, high density polyethylene, linear low density polyethylene; copolymers of polyethylene, including those based on ethylene-butene, ethylene-hexene, ethylene-octene, ethylene-vinyl-acetate, ethylene-methyl-acrylate, ethylene-ethyl-acrylate, ethylene-butyl-acrylate, and similar materials; and ethylene-propylene or ethylene-propylene diene elastomers; and those of the above prepared using so-called metallocene catalysts.

In addition, one or more additional materials may be incorporated to act as compatibilising agents for the polyolefin and polypropylene blend. Such materials would include the polypropylenes, higher polyolefins, and polyolefin materials described above, including those modified with reactive functional groups, such as acrylic acids, methacrylic acids, acrylates, methacrylates and anhydrides; and block copolymers, such as styrene-butadiene, styrene-butadiene-styrene, styrene-ethylene/propylene and styrene-ethylene/butylene-styrene. These compatibilising agents may be incorporated prior to the silane grafting reaction, but may also be added to the silane-modified composition during subsequent melt processing.

The silane-modified blend is then formed into the desired article by melt processing techniques such as extrusion and moulding, including multi-layer processing, for example co-extrusion of the blend with another material to form discrete but intimately bonded layers. The article thus formed is cross-linked in the presence of a silanol condensation catalyst under suitable conditions of heat and moisture, the catalyst being either blended with the composition during melt processing or added subsequently by coating the formed article, for example. The crosslinking thus performed stabilises the physical structure of the blend of silane-modified polypropylene and polyolefin through the formation of an interpenetrating network.

Accordingly, in one aspect, the present invention provides a heat shrinkable coating material of a crosslinked composition consisting of a silane-modified polypropylene polyolefin blend, said material being formed by a process comprising: (a) reacting a pre-blended mixture of polypropylene and polyolefin resins with an appropriate silane and silane-grafting initiator to produce a silane-modified polypropylene—polyolefin composition; (b) forming the coating or insulating material by melt processing the composition produced in step (a) with a silanol condensation catalyst; and (c) crosslinking the formed coating or insulating material by exposing it to a combined regimen of heat and moisture.

DETAILED DESCRIPTION OF PREFERRED EMBODIMENTS

The crosslinking of polymers, in particular polyolefins, by the combined process of chemical grafting of silane molecules onto the polymer to form a silane-grafted resin, followed by catalysed hydrolysis and condensation of the silane, is a well known and established process, such as is described in U.S. Pat. No. 3,646,155, which is incorporated herein by reference in its entirety.

According to the present invention, a blended mixture is formed from a polyolefin which primarily crosslinks in the presence of free radicals; and a polypropylene, or higher polyolefin, which primarily degrades, undergoes chain scission and/or becomes reduced in molecular weight in the presence of free radicals.

The polyolefin which primarily crosslinks in the presence of free radicals is preferably selected from polyethylene and co-polymers of ethylene prepared by polymerising ethylene with one or more of an unsaturated olefin monomer having from 3 to 20 carbon atoms, preferably propylene, butylene, hexene or octene, a substituted olefin such as vinyl acetate, methyl acrylate, ethyl acrylate or butyl acrylate, or a diene monomer, such as ethylidene norbornene. The polyolefin is preferentially present in the form of high-density polyethylene, linear low-density polyethylene or an ethylene copolymer polymerised using a so-called metallocene catalyst. Preferably, the polyolefin resin comprises about 50 to 100% by weight ethylene, more preferably about 60 to 90% by weight ethylene, and most preferably about 80 to 95% by weight ethylene. Preferably, the density of the polyethylene or the ethylene co-polymer is in the range from about 0.85 to about 0.97 g/cm$^3$.

The polypropylene or polypropylenes in this invention may be selected from homopolymers or copolymers of polypropylene, being preferentially isotactic in nature, with a melt viscosity chosen to be similar and comparable in value to the polyolefin described above for maximum process compatibility, and being added in an amount of from about 10 to about 90 percent by weight of the composition. In order to provide a polymeric composition having suitable physical properties at high temperatures, it is preferred that the polypropylene content of the composition be maximized. For example, it is preferred that the polypropylene content of the composition be greater than 50% by weight, and more preferably greater than 60% by weight. In particularly preferred embodiments of the present invention, the content of polypropylene in the composition is from about 50 to about 80% by weight, more preferably from about 55 to about 70% by weight, and even more preferably from about 60 to about 70% by weight. Preferably, the polypropylene has a density in the range from about 0.86 to about 0.92 g/cm$^3$.

The higher polyolefins which primarily degrade in the presence of free radicals comprise polyolefins containing tertiary or quaternary carbon atoms and of the general formula —(CH$_2$CR$^1$R$^2$)$_n$—, where R$^1$ is an alkyl group and R$^2$ is an alkyl group or a hydrogen atom with the proviso that R$^1$ and R$^2$ are selected such that the repeat unit contains four-or-more carbon atoms. Specific examples of such higher olefins include polybutene, polymethylpentene, polyisobutylene and butyl rubber. In embodiments of the inventions were such higher polyolefins are utilized, they are preferably added in the amounts described in the preceding paragraph for preferred amounts of polypropylene. Similarly, a combination of polypropylenes and such higher polymers may be utilized, with the combined amounts of the polypropylenes and higher polymers being as described in the preceding paragraphs.

In addition, it is generally preferred that a compatibilising agent, or compatibiliser, is also incorporated to provide enhanced blending of the polypropylene, or higher polyolefin, resin with the polyolefin resin, these resins being typically relatively incompatible with one another, and thus prone to phase separation which leads ultimately to the integrity and mechanical properties of the mixture being compromised. A suitable compatibiliser will increase the miscibility and hence compatibility of the mixture by decreasing the scale of segregation of the polypropylene, or higher polyolefin, and polyolefin resin components. The compatibiliser may also be added at the melt processing, or forming, stage after grafting of the blend.

The compatibiliser may be selected from any of the polypropylenes, polyolefins and higher polyolefins resins described above, or these resins modified with reactive functional groups, such as acrylic acids, methacrylic acids, acrylates, methacrylates and anhydrides; and block copolymers, such as styrene-butadiene, styrene-butadiene-styrene, styrene-ethylene/propylene and styrene-ethylene/butylene-styrene. Preferred compatibilisers include polyolefins, including polypropylenes, grafted with maleic anhydride, acrylic acid or other suitable functional groups, ethylene-propylene elastomers, and metallocene-catalysed polyolefin resins. The compatibilising agent is preferably added in an amount from about 1 to 50 percent by weight.

The polypropylene and/or higher polyolefin resin, and polyolefin resin described above, with or without a compatibiliser, are mixed together in the solid state by tumble blending or similar method, the admixed resins then being reacted in the molten state with an organic silane having the general formula RR'SiY$_2$, wherein R represents a monovalent olefinically unsaturated hydrocarbon radical, Y represents a hydrolysable organic radical and R' represents an R radical or a Y radical. The monovalent olefinically unsaturated hydrocarbon radical preferably comprises vinyl, allyl, butenyl, cyclohexenyl, cyclopentadienyl, or cyclohexadienyl radicals. The group Y may represent any hydrolysable organic radical, for example an alkoxy radical such as methoxy, ethoxy and butoxy radicals; an acyloxy radical, for example the formyloxy, acetoxy or propionoxy radicals; oximo radicals such as —ON=C(CH$_3$)$_2$, —ON=CCH$_3$C$_2$H$_5$ and ON=C(C$_6$H$_5$)$_2$; or substituted amino radicals such as alkylamino and arylamino radicals, examples of which are —NHCH$_3$, —NHC$_2$H$_5$ and —NH(C$_6$H$_5$)$_2$.

Preferably, the silane has general formula RSiY$_3$, with the most preferred group R being the vinyl radical, and the most preferred Y group being the methoxy and ethoxy radical. Accordingly, the most preferred silanes for use in the present invention are vinyltriethoxysilane and vinyltrimethoxysilane.

The amount of silane reacted with the polyolefin depends in part upon the reaction conditions and the degree of modification desired in the polyolefin. The proportion may vary from about 0.1 to about 50% by weight based on the total weight of the silane-grafted resin, more preferably from about 0.5 to 10% by weight, and most preferably from about 1.0 to 2.5% by weight.

A free-radical initiator is also incorporated into the molten mixture to initiate the graft polymerization reaction. Preferred free-radical initiators are organic peroxides such as benzoyl peroxide, dichlorobenzoyl peroxide, dicumyl peroxide, di-tertiary butyl peroxide. The most preferred free-radical initiator for use in the compositions of the present invention is dicumyl peroxide. The criteria for choosing an appropriate free-radical initiator are known to persons skilled in the art and are described in the above-mentioned U.S. Pat. No. 3,646,155 and will not be repeated here.

Preferably, the organic peroxide free-radical initiator is added in an amount of from about 0.1 to about 1.0% by weight of the silane-grafted resin, more preferably from about 0.05 to 0.25% by weight.

The silane and peroxide are reacted with the resin mixture above the melting point of the highest melting point resin component under conditions in which all the components are subjected to dispersive and distributive mixing, using processes known to those skilled in the art.

The silane-modified resin blend so produced is subsequently melt-processed as described previously, with a suitable amount of silanol condensation catalyst, and optionally with one or more of a number of other ingredients, such as pigmenting agents, mineral fillers, flame-retardant additives, antioxidants, stabilisers, lubricants, compatibilisers and the like, to form a composition according to the invention.

The silanol condensation catalyst is typically selected from the group comprising organic bases, carboxylic acids and organometallic compounds including organic titanates and complexes or carboxylates of lead, cobalt, iron, nickel, zinc and tin. Preferably, the catalyst is selected from dibutyltin dilaurate, dibutyltin diacetate, dibutyltin octanoate, dioctyltin maleate, dibutyltin oxide and titanium compounds such as titanium-2-ethylhexoxide. The most preferred silanol condensation catalyst is dibutyltin dilaurate, though any material which will catalyse the silane condensation reaction is suitable for the invention. The condensation catalyst is preferably added in an amount of from about 0.01 to about 1 percent by weight of the coating material, more preferably about 0.05 to about 0.5 percent by weight, and most preferably about 0.1 to 0.2 percent by weight.

Subjecting the composition thus produced to moisture, preferably at an elevated temperature, will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. Also, subjecting the composition to combined heat and moisture will further accelerate the crosslinking reaction. Most preferably, crosslinking is effected at a temperature above 50° C. and most preferably by exposing the composition to a temperature of 85° C. and a relative humidity of 90% or greater for approximately 100 hours.

A particularly preferred process for producing and forming a composition of the present invention will now be described below:

The required quantities of polypropylene, polyolefin, silane, peroxide free-radical initiator, and optional compatibiliser and processing stabiliser, are pre-blended, and then passed through a suitable mixing device, such as an extruder or continuous compounding machine, at a temperature above the melting point of the highest melting point resin component and the decomposition temperature of the peroxide, in order to accomplish grafting of the silane onto the polyolefin. The silane may be added with or without a resin or mineral carrier or binder for the silane, in order to facilitate handling of said silane. The specific conditions of temperature and mixing efficiency dictate the extent of grafting and the quality of silane-grafted material thus produced, and are of prime consideration. The silane grafted material is then passed through a multi-strand dye into a trough of cooled water, or through a die-face pelletizing unit, then chopped into pellets and dried.

The grafted polymer pellets are then combined with the desired quantities of a silane condensation catalyst, an antioxidant stabiliser, and any number of optional ingredients, including colorants, mineral fillers, flame retardants, compatibilisers, and processing aids, individually or in pre-masterbatched form, this mixture then being homogenised by melt processing, for example, by extruding, co-extruding or moulding, and then formed whilst in this state into the desired shape of the article required, for example sheet, tubing, electrical insulation or moulded shape.

Alternatively, the independent silane grafting, and extrusion mixing and forming processes described above may be combined into a single step operation wherein the extrusion mixing and forming occurs sequentially and in rapid succession with the silane grafting of the resin blend. This may be accomplished in a single extruder with a dual stage screw, or screws, the first stage designed for silane grafting and the second stage designed for subsequent incorporation and melt mixing of the additional ingredients into the silane grafted melt. Another option would be a "piggy-back" configuration, wherein a separate silane grafting reactor or extruder feeds directly into a second extruder for the subsequent mixing and forming operation.

The formed material thus produced is then exposed to moisture, preferably at an elevated temperature, to induce crosslinking of the material. This may be accomplished in a hot water bath or, more preferably, in a steam chamber, for example. The material can also be made to crosslink at ambient conditions of temperature and humidity, but the time to effect complete crosslinking of the material will necessarily be longer. Preferably, the degree of crosslinking is such that the materials according to the invention have a gel fraction of greater than about 20%, more preferably greater than about 25%.

The composition of the invention thus produced exhibits the property of softening but not melting when re-heated to a temperature which is close to or above its softening point or crystalline melting point. This is desirable for the manufacture of heat-shrinkable articles since the formed material may be stretched beyond the original extruded or moulded dimensions without rupture using relatively low forces, and can then be frozen in the stretched state by cooling it rapidly to below the melting point. Stretching can be accomplished by mechanical, pneumatic or hydraulic means. At this point the stretched crosslinks are held in a stable state by the re-formed, solid crystalline regions. Subsequent re-heating of the stretched article above the melting point will cause the crystalline regions to re-melt and the structure to revert to its original extruded or moulded dimensions. The crosslinking also prevents the article from becoming liquid during this shrinking process, and provides the heat-distortion resistance and hot-set properties required for high temperature coating, electrical insulation, and jacketing applications, for example.

The invention is further illustrated by the following Examples:

EXAMPLES 1, 2, 3, 4

The polypropylene-based compositions listed as Examples 1,2,3, and 4 in Table 1, below, were prepared as silane-grafted resin blends by tumble blending the resin and silane components, these then being reactively processed through a 30:1 L/D extruder designed to provide the required mixing efficiency and residence time for effective grafting, at a melt temperature above the melting point of the polypropylene component. Examples 3 and 4 contain compatibiliser.

TABLE 1

Silane-Grafted Polypropylene Blends

| | Percent By Weight | | | |
|---|---|---|---|---|
| Ingredient | Example 1 | Example 2 | Example 3 | Example 4 |
| Polypropylene<br>Density 0.900 g/cm$^3$,<br>Melt Flow Rate 0.45 g/10 min. | 68.63 | 68.63 | 58.82 | 58.82 |
| Linear Low Density Polyethylene<br>Density 0.919 g/cm$^3$,<br>Melt Index 6.0 g/10 min. | 29.41 | | 29.41 | |
| High Density Polyethylene<br>Density 0.960 g/cm$^3$,<br>Melt Index 4.9 g/10 min. | | 29.41 | | 29.41 |
| Maleic Anhydride Modified Polypropylene<br>Density 0.91 g/cm$^3$,<br>Melt Flow Rate 7.0, g/10 min. 0.2%<br>MA | | | 9.81 | 9.81 |
| Vinyl Triethoxysilane | 1.96 | 1.96 | 1.96 | 1.96 |

EXAMPLES 5, 6, 7, 8

These examples describe the production of a crosslinked, extruded sheet according to the present invention.

The grafted pellets produced according to Examples 1, 2, and 3 were blended with the ingredients indicated in Table 2. The combined ingredients were fed at a melt temperature of approximately 180° C. through a 24:1 L/D single screw extruder equipped with a single layer sheet die. The extruded sheet was fixed to the required dimensions of width and thickness by passing it through a cooled, 3-roll calendering stack, then wound onto reels.

The sheet was crosslinked by conditioning the reeled sheet at a temperature of 85° C. and a relative humidity of 90% for approximately 100 hours. This crosslinked sheet was then tested to determine the degree of crosslinking and for mechanical properties as indicated in Table 3.

TABLE 2

Moisture-Crosslinkable, Polypropylene Compositions

| | Percent By Weight | | | |
|---|---|---|---|---|
| | Example 5 | Example 6 | Example 7 | Example 8 |
| Example 1<br>Melt Flow Index 2.3 g/10 min. | 95.24 | | | |
| Example 2<br>Melt Flow Index 1.2 g/10 min | | 95.24 | | 85.72 |
| Example 3<br>Melt Flow Index 1.3 g/10 min. | | | 95.24 | |
| Maleic Anhydride Modified Polypropylene | | | | 9.52 |
| Dibutyltin dilaurate Catalyst* | 1.42 | 1.42 | 1.42 | 1.42 |
| Antioxidant Stabiliser** | 2.86 | 2.86 | 2.86 | 2.86 |
| Carbon Black*** | 0.48 | 0.48 | 0.48 | 0.48 |

*Added as a 2% masterbatch in polyethylene.
**Blend of hindered phenol and phosphite stabiliser added as a 15% masterbatch in polyethylene.
***Added as a 25% masterbatch in polyethylene

TABLE 3

Properties of Crosslinked Sheet

| | Value | | | |
|---|---|---|---|---|
| Property | Example 5 | Example 6 | Example 7 | Example 8 |
| Gel Fraction<br>(% degree of crosslinking) | 24 | 23 | 23 | 26 |
| Hot Tensile Strength @<br>200° C., 100%<br>Elongation (psi) | 4.3 | 5.6 | 5.5 | 6.5 |
| Ultimate Hot Elongation @<br>200° C. (%) | 140 | >200 | >200 | 160 |
| Ultimate Tensile Strength @<br>23° C. (psi) | 4400 | 4300 | 3500 | 2500 |
| Ultimate Elongation @<br>23° C. (%) | 630 | 700 | 550 | 500 |
| Flexural Modulus (psi) | 31000 | 48000 | 48000 | 58000 |

EXAMPLES 9, 10, 11, 12

This example describes the production of a heat-shrinkable, extruded sheet product according to the present invention.

The crosslinked sheets prepared in Example 5, 6, 7 and 8 were re-heated to a temperature close to or above the softening point or crystalline melting point of the composition and then stretched by a factor of approximately 2:1 whilst at this temperature using either a machine-direction or transverse-direction mechanical stretcher. Whilst in the stretched state, the sheet was rapidly cooled, using air, water or some other suitable medium, to below the softening or crystalline melting point of the composition in order to fix the sheet at the stretched dimensions. The sheet, either prior to or after stretching, may be extrusion laminated or coated with an additional layer of material having different functional properties, such as a heat-activated adhesive. The stretched sheet was mechanically tested for suitability as a heat-shrink coating for high-temperature pipeline joints to specifications common to the industry.

EXAMPLE 13

In another example, a heat-shrinkable tubing product was produced by extruding the formulation in Example 5 into a tubular cross-section, collecting the extruded tubing on a reel, crosslinking the reeled tubing using the conditions noted above for Examples 5, 6, 7 and 8, heating the thus crosslinked tube to a temperature close to or above the softening point or crystalline melting point of the composition, stretching the heated tube by mechanical or pneumatic means whilst at this temperature, and then finally rapidly cooling the tube with air or water, or some other suitable means, to below the softening point or crystalline melting point of the composition whilst maintaining the tubing in the stretched state. The tubing, either prior to or after stretching, may also be internally extrusion coated with an additional layer of material having different functional properties, such as a heat-activated adhesive. The stretched tubing was mechanically tested for suitability as a heat-shrink insulation for electrical and electronic connections, splices, and terminations in accordance with specifications common to the industry.

Although the invention has been described in relation to certain preferred embodiments, it will be appreciated that it is not intended to be limited thereto. Rather, the invention is intended to encompass all embodiments which fall within the scope of the following claims.

What is claimed is:

1. A coating or insulating material comprising a crosslinked composition containing a silane-modified polyolefin blend, said material being formed by a process comprising:
   (a) blending a polyolefin which primarily crosslinks in the presence of free radicals with a polypropylene and/or a higher polyolefin which primarily degrades, undergoes chain scission, and/or is reduced in molecular weight in the presence of free radicals, thereby forming a blended mixture;
   (b) reacting the blended mixture with a silane in the presence of a silane-grafting initiator to produce a silane grafted blended polyolefin composition,
   (c) forming said coating or insulating material by melt processing the silane grafted polyolefin composition produced in (b) with a silanol condensation catalyst and optional additional ingredients required to impart suitable product processing, mixture compatibility, and performance characteristics; and
   (d) crosslinking the coating or insulating material formed in (c) by exposing it to moisture, wherein said crosslinking provides said coating material with thermoset properties such that, when the crosslinked coating material is heated to a temperature close to or above its softening point or its crystalline melting point, the coating material is softened but not re-melted; and
   (e) softening the coating or insulating material crosslinked in step (d) by application of heat thereto, stretching said coating or insulating material and then freezing said material in its stretched form;
wherein the polypropylene and/or higher polyolefin which primarily degrades in the presence of free radicals is incorporated into the mixture of step (a) in an amount greater than 50 percent by weight of the coating or insulating material.

2. The coating or insulating material according to claim 1, wherein the polypropylene and/or higher polyolefin which primarily degrades in the presence of free radicals is incorporated into the mixture of step (a) in an amount greater than 60 percent by weight of the coating or insulating material.

3. The coating or insulating material according to claim 1, wherein the polypropylene and/or higher polyolefin which primarily degrades in the presence of free radicals is incorporated into the mixture of step (a) in an amount of from greater than 50 to about 80 percent by weight of the coating or insulating material.

4. The coating or insulating material according to claim 1, wherein the polypropylene and/or higher polyolefin which primarily degrades in the presence of free radicals is incorporated into the mixture of step (a) in an amount of from about 55 to about 70 percent by weight of the coating or insulating material.

5. The coating or insulating material according to claim 1, wherein the polypropylene and/or higher polyolefin which primarily degrades in the presence of free radicals is incorporated into the mixture of step (a) in an amount of from about 60 to about 70 percent by weight of the coating or insulating material.

6. The coating or insulating material according to claim 1, wherein the polyolefin which primarily crosslinks in the presence of free radicals is selected from the group comprising polyethylene and copolymers of ethylene with an olefin having from 3 to 20 carbon atoms.

7. The coating or insulating material according to claim 1, wherein the polyolefin which primarily crosslinks in the presence of free radicals comprises a copolymer of ethylene with one or more of propylene, butylene, hexene and octene, ethylidene norbornene, dicyclopentadiene, 1,4-hexadiene, vinyl acetate, methyl acrylate, ethyl acrylate and butyl acrylate.

8. The coating or insulating material according to claim 1, wherein the density of the polyolefin which primarily crosslinks in the presence of free radicals is from about 0.85 to about 0.97 g/cm$^3$.

9. The coating or insulating material according to claim 1, wherein the polypropylene is selected from the group comprising polypropylene homopolymers and copolymers of propylene with an olefin other than propylene, the polypropylene having a density from about 0.86 to 0.92.

10. The coating or insulating material according to claim 9, wherein the polypropylene has a melt viscosity similar to that of the polyolefin.

11. The coating or insulating material according to claim 1, wherein the silane has the general formula RR'SiY$_2$ wherein R represents a monovalent olefinically unsaturated hydrocarbon or hydrocarbonoxy radical, Y represents a hydrolysable organic radical and R' represents an R radical or a Y radical.

12. The coating or insulating material according to claim 11, wherein the monovalent olefinically unsaturated hydrocarbon or hydrocarbonoxy radical is selected from the group comprising vinyl, allyl, butenyl, cyclohexenyl, cyclopentadienyl, and cyclohexadienyl.

13. The coating or insulating material according to claim 11, wherein Y represents a hydrolysable organic radical selected from the group comprising methoxy, ethoxy and butoxy, formyloxy, acetoxy, propionoxy; oximo radicals such as —ON=C(CH$_3$)$_2$, —ON=CCH$_3$C$_2$H$_5$ and ON=C (C$_6$H$_5$)$_2$; or substituted amino radicals such as alkylamino and arylamino radicals, examples of which are —NHCH$_3$, —NHC$_2$H$_5$ and —NH(C$_6$H$_5$)$_2$.

14. The coating or insulating material according to claim 11, wherein the silane has general formula RSiY$_3$, with R being vinyl and Y being methoxy or ethoxy.

15. The coating or insulating material according to claim 1, wherein the silane-modified polyolefin blend contains from about 1.0 to about 2.5 percent of silane monomer by weight of the silane-modified blend.

16. The coating or insulating material according to claim 1, wherein the silane-grafting initiator is an organic peroxide.

17. A coating or insulating material comprising a crosslinked composition containing a silane-modified polyolefin blend, said material being formed by a process comprising:
(a) blending a polyolefin which primarily crosslinks in the presence of free radicals with a polypropylene and/or a higher polyolefin which primarily degrades, undergoes chain scission, and/or is reduced in molecular weight in the presence of free radicals, thereby forming a blended mixture;
(b) reacting the blended mixture with a silane in the presence of a silane-grafting initiator to produce a silane grafted blended polyolefin composition;
(c) forming said coating or insulating material by melt processing the silane grafted polyolefin composition produced in (b) with a silanol condensation catalyst and optional additional ingredients required to impart suitable product processing, mixture compatibility, and performance characteristics; and
(d) crosslinking the coating or insulating material formed in (c) by exposing it to moisture, wherein said crosslinking provides said coating material with thermoset properties such that, when the crosslinked coating material is heated to a temperature close to or above its softening point or its crystalline melting point, the coating material is softened but not remelted; and
(e) softening the coating or insulating material crosslinked in step (d) by application of heat thereto, stretching said coating or insulating material and then freezing said material in its stretched form;
wherein the higher polyolefin which primarily degrades in the presence of free radicals comprises polyolefins containing tertiary or quaternary carbon atoms of the general formula —$(CH_2CR^1R^2-)_n$, where $R^1$ is an alkyl group and $R^2$ is an alkyl group or a hydrogen atom with the proviso that $R^1$ and $R^2$ are selected such that the repeat unit contains four-or-more carbon atoms.

18. The coating or insulating material according to claim 17, wherein said higher olefin is selected from polybutene, polymethylpentene, polyisobutylene and butyl rubber.

19. A coating or insulating material comprising a crosslinked composition containing a silane-modified polyolefin blend, said material being formed by a process comprising:
(a) blending a polyolefin which primarily crosslinks in the presence of free radicals with a polypropylene and/or a higher polyolefin which primarily degrades, undergoes chain scission, and/or is reduced in molecular weight in the presence of free radicals, thereby forming a blended mixture;
(b) reacting the blended mixture with a silane in the presence of a silane-grafting initiator to produce a silane grafted blended polyolefin composition;
(c) forming said coating or insulating material by melt processing the silane grafted polyolefin composition produced in (b) with a silanol condensation catalyst and optional additional ingredients required to impart suitable product processing, mixture compatibility, and performance characteristics; and
(d) crosslinking the coating or insulating material formed in (c) by exposing it to moisture, wherein said crosslinking provides said coating material with thermoset properties such that, when the crosslinked coating material is heated to a temperature close to or above its softening point or its crystalline melting point, the coating material is softened but not re-melted; and
(e) softening the coating or insulating material crosslinked in step (d) by application of heat thereto, stretching said coating or insulating material and then freezing said material in its stretched form;
wherein said blended mixture formed in (a) further comprises a compatibilising agent selected from the group comprising unmodified polyolefins, polyolefins modified with reactive functional groups, and block copolymers; said unmodified polyolefins including polypropylene homopolymers or copolymers, copolymers of ethylene and propylenes such as ethylene-propylene or ethylene-propylene diene elastomers; said polyolefins modified with reactive functional groups including acrylic acids, methacrylic acids, acrylates, methacrylates and anhydrides; and said block copolymers including styrene-butadiene, styrene-butadiene-styrene, styrene-ethylene/propylene and styrene-ethylene/butylene-styrene.

20. A coating or insulating material comprising a crosslinked composition containing a silane-modified polyolefin blend, said material being formed by a process comprising:
a) blending a polyolefin which primarily crosslinks in the presence of free radicals with a polypropylene and/or a higher polyolefin which primarily degrades, undergoes chain scission, and/or is reduced in molecular weight in the presence of free radicals, thereby forming a blended mixture;
(b) reacting the blended mixture with a silane in the presence of a silane-grafting initiator to produce a silane grafted blended polyolefin composition,
(c) forming said coating or insulating material by melt processing the silane grafted polyolefin composition produced in (b) with a silanol condensation catalyst and optional additional ingredients required to impart suitable product processing, mixture compatibility, and performance characteristics; and
(d) crosslinking the coating or insulating material formed in (c) by exposing it to moisture, wherein said crosslinking provides said coating material with thermoset properties such that, when the crosslinked coating material is heated to a temperature close to or above its softening point or its crystalline melting point, the coating material is softened but not remelted; and
(e) softening the coating or insulating material crosslinked in step (d) by application of heat thereto, stretching said coating or insulating material and then freezing said material in its stretched form;
wherein a compatibilising agent is added to the mixture of step (a) in an amount from about 1 to 50 percent by weight of the coating or insulating material.

21. The coating or insulating material according to claim 1, wherein the silanol condensation catalyst is selected from the group comprising dibutyltin dilaurate and dibutyltin oxide.

22. The coating or insulating material according to claim 1, wherein said optional additional ingredients are selected from one or more members of the group comprising antioxidants, fillers, flame-retardants, colorants, UV stabilizers, lubricants and process aids.

* * * * *